US010208230B2

(12) United States Patent
December et al.

(10) Patent No.: US 10,208,230 B2
(45) Date of Patent: Feb. 19, 2019

(54) ONE COMPONENT, LOW TEMPERATURE CURE COATING FORMED VIA A DOUBLE LAYER CURING MECHANISM

(71) Applicant: BASF Coatings GmbH, Muenster-Hiltrup (DE)

(72) Inventors: Timothy S. December, Rochester Hills, MI (US); Dominik Wechsler, Kingston (CA); Charles H. Honeyman, Toronto (CA); Adam M. Ozvald, Kingston (CA)

(73) Assignee: BASF COATINGS GmbH, Muenster-Hiltrup (DE)

( * ) Notice: Subject to any disclaimer, the term of this patent is extended or adjusted under 35 U.S.C. 154(b) by 234 days.

(21) Appl. No.: 15/220,062

(22) Filed: Jul. 26, 2016

(65) Prior Publication Data

US 2018/0030310 A1   Feb. 1, 2018

(51) Int. Cl.

| C09D 187/00 | (2006.01) |
| C09D 133/08 | (2006.01) |
| B32B 27/40 | (2006.01) |
| C08G 18/54 | (2006.01) |
| C08G 18/76 | (2006.01) |
| C08G 18/80 | (2006.01) |
| C08G 18/16 | (2006.01) |
| C08G 18/24 | (2006.01) |

(Continued)

(52) U.S. Cl.
CPC .......... *C09D 187/005* (2013.01); *B32B 27/40* (2013.01); *C08G 18/163* (2013.01); *C08G 18/166* (2013.01); *C08G 18/242* (2013.01); *C08G 18/40* (2013.01); *C08G 18/544* (2013.01); *C08G 18/765* (2013.01); *C08G 18/7671* (2013.01); *C08G 18/8022* (2013.01); *C08G 18/8077* (2013.01); *C09D 133/08* (2013.01); *C09D 175/04* (2013.01); *C08K 5/34922* (2013.01); *C08L 61/28* (2013.01)

(58) Field of Classification Search
CPC .............. C09D 187/005; C09D 133/08; C08K 5/34922
See application file for complete search history.

(56) References Cited

U.S. PATENT DOCUMENTS 5,578,346 A * 11/1996 Moy ...................... B05D 1/36
427/333

* cited by examiner

*Primary Examiner* — Robert D. Harlan
(74) *Attorney, Agent, or Firm* — Oblon, McClelland, Maier & Neustadt, L.L.P.

(57) ABSTRACT

Shelf-stable low temperature cure coating compositions that include a hydroxy-functional resin, a crosslinking agent, and a catalyst that does not catalyze the crosslinking reaction between hydroxy-functional resin and the crosslinking agent contained therein, but instead between a hydroxy-functional resin and a crosslinking agent contained in a different low temperature cure coating composition. In addition, low temperature cure composite coatings that include: a basecoat of a low temperature cure coating composition containing a first hydroxy-functional resin, a first crosslinking agent, and a first catalyst; and a topcoat containing a second hydroxy-functional resin, a second crosslinking agent, and a second catalyst, where the first catalyst migrates into the topcoat from the basecoat and catalyzes the reaction between the second hydroxy-functional resin and crosslinking agent, and the second catalyst migrates into the basecoat from the topcoat and catalyzes the reaction between the first hydroxy-functional resin and crosslinking agent.

19 Claims, 7 Drawing Sheets

(51) Int. Cl.
C09D 175/04 (2006.01)
C08G 18/40 (2006.01)
C08K 5/3492 (2006.01)
C08L 61/28 (2006.01)

| | |
|---|---|
| Single Coat:<br>• BC with DBTDL (5% w/w)<br>• Very tacky, no cracking<br>• Wipes off with MIBK | No Coating |
| Double Coat:<br>• BC with DBTDL (5% w/w)<br>• CC with DDBSA (1.5% w/w)<br>• No tack or cracking<br>• Partially wipes off with MIBK | Single Coat:<br>• CC with DDBSA (1.5% w/w)<br>• Very tacky, no cracking<br>• Wipes off with MIBK |

FIGURE 5

ONE COMPONENT, LOW TEMPERATURE CURE COATING FORMED VIA A DOUBLE LAYER CURING MECHANISM

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF THE MATERIAL ON THE COMPACT DISC

Not applicable.

BACKGROUND OF THE INVENTION

Field of the Invention

The present invention relates to low temperature cure coating compositions, low temperature cure composite coatings that are formed by a double layer curing mechanism, and articles comprising the low temperature cure composite coatings. The low temperature cure coating compositions cure at temperatures from 80 to 120° C. in 20 minutes or less and thus, are suitable for heat sensitive or plastic substrates.

DESCRIPTION OF THE RELATED ART INCLUDING INFORMATION DISCLOSED UNDER 37 CFR 1.97 AND 1.98

In typical automotive coatings, four layers are applied to the metal surface of a vehicle: an e-coat, a primer, a basecoat, and a clearcoat. The e-coat and the primer layers are generally applied to the vehicle surface and cured. Subsequently, a basecoat formulation is applied with solvent, and the solvent is flashed off in a high temperature process. After properly conditioning the base coat, the clearcoat is applied next to provide the vehicle with a glossy finish and to protect against corrosion. Lastly, the coated vehicle surface is passed through an oven at temperatures in excess of 140° C. for 20 minutes, to cure the basecoat and clearcoat.

Although the conventional process is adequate and used commercially worldwide in the automotive industry, there is significant room for improvement. For one, any reduction in energy, materials, or the time required to make these coatings would result in large economic gains due to the large scale of use. In particular, it would be advantageous for vehicle manufacturers to reduce the number of high temperature steps as well as the process time. Additionally, it would be beneficial to reduce the temperature at which these steps are conducted.

At the same time, the automotive industry is being challenged to meet increasingly stringent Federal Corporate Average Fuel Economy (CAFE) standards for vehicle fleets. One key strategy to improve the overall fuel efficiency (mpg) of vehicles is to develop "light-weight" vehicles. A means for greatly reducing the weight of the automobile body is to replace heavier steel parts with lighter weight plastic parts. However, the use of light-weight plastics in the conventional process is an issue because many light-weight plastic substrate materials physically deform at curing temperatures greater than 130° C. Consequently, a reduction in the curing temperatures of the basecoat and the clearcoat would permit the use of plastic and other heat sensitive substrates necessary to reduce the weight of vehicle fleets.

Finally, it would be beneficial to employ single-component systems that are stable for extended periods of time without decomposing or prematurely curing as is typical for two-component systems in which one component contains a curable resin and the other component contains a crosslinking agent for the curable resin. Several problems exist with two-component systems (i.e., separately packaged curable resins and crosslinking agents). There are inaccuracies arising from measuring and metering of precise amounts of each component by the preparer, which can lead to incomplete or too rapid of curing. This could cause undesirable product properties, for example, film tackiness, cracking, and delamination. Therefore, costly metering equipment and metering aids are usually employed to ensure the precise amounts of the separate components are mixed. The mixing of the components can also be an issue (i.e., overmixing or undermixing). Two-component systems also require purge lines to avoid gelling of the individual components once they are mixed.

The objects of the present invention are achieved with shelf stable one-component coating compositions (i.e., premixed) that are curable at temperatures from 80 to 120° C. with cure times of 20 minutes or less. These low temperature cure coating compositions include a hydroxy-functional resin, a crosslinking agent, which may be blocked, and a catalyst. The coating compositions are shelf-stable because the catalyst included in the composition does not catalyze the crosslinking reaction between hydroxy-functional resin and the crosslinking agent contained therein. Instead, the catalyst included in the low temperature cure coating compositions are configured to catalyze a crosslinking reaction between a further hydroxy-functional resin and a further crosslinking agent that are contained in a neighboring one-component low temperature cure coating composition. Generally, the low temperature cure compositions are applied to form a low temperature cure composite coating that includes a topcoat and a basecoat as follows:

(1) bottom layer of a basecoat resin/cross-linking agent mixed with a catalyst for curing of the clearcoat; and
(2) top layer of a clearcoat resin/cross-linking agent mixed with a catalyst for curing of the basecoat.

Once these layers are placed on a material surface, they may be simultaneously cured with a single heating operation due to a mutual migration phenomenon in which the catalyst originally contained in bottom layer migrates into the top layer and affects the curing of the top layer while the catalyst originally contained in the top layer migrates into the bottom layer and affects the curing of the bottom layer.

BRIEF SUMMARY OF THE INVENTION

The low temperature cure coating compositions of the present invention are shelf-stable and ideal for heat sensitive or plastic substrates because they cure at temperatures from 80 to 120° C.

The low temperature cure coating compositions each comprise a hydroxy-functional resin, a crosslinking agent, and a catalyst that does not catalyze the crosslinking reaction between hydroxy-functional resin and the crosslinking agent contained therein. In other words, the low temperature cure coating compositions each include a catalyst that is inactive to the crosslinking of the hydroxy-functional resin and the crosslinking agent included in the composition. Instead, the catalyst included in the low temperature cure coating compositions are configured to catalyze a crosslinking reaction between another hydroxy-functional resin and a different crosslinking agent that are contained in a neighboring low temperature cure coating composition.

Inclusion of an inactive catalyst avoids the premature curing and reaction that would accompany an active catalyst and thus improves the shelf-stability of the low temperature cure coating compositions; at least until the compositions come into contact with a neighboring coating composition that contains a catalyst that affects the crosslinking of the hydroxy-functional resin and the crosslinking agent, while at the same time being inactive to the hydroxy-functional resin and the crosslinking agent contained therein (i.e., the neighboring catalyst is inactive to its hydroxy-functional resin and crosslinking agent).

The temperature stability and shelf life of the low temperature cure coating compositions are further improved by blocking or protecting the reactive groups of the crosslinking agent. Blocking the reactive groups of the crosslinking agent results in a higher onset curing temperature that enables the provision of single-component compositions in which the hydroxy-functional resin, the blocked crosslinking agent, and the catalyst configured to catalyze a crosslinking reaction between a different hydroxy-functional resin and crosslinking agent contained in a different low temperature cure coating composition are all contained in single-component or pre-mixed composition prior to the application of the coating composition.

The low temperature cure composite coatings of the present invention include a first layer comprising a first low temperature cure coating composition and a second layer comprising a second low temperature cure coating composition, where the first layer and the second layer are adjacent to each other, and preferably directly adjacent to each other. The first low temperature cure coating composition is a solventborne composition comprising a first hydroxy-functional resin, a first crosslinking agent, and a first catalyst, while the second low temperature cure coating composition is a solventborne composition comprising a second hydroxy-functional resin, a second crosslinking agent, and a second catalyst.

The first layer, which is generally denoted as the bottom layer or the basecoat, of the low temperature cure composite coating is formed by applying the first low temperature cure coating composition to a substrate, and the second layer, which is generally denoted as the top layer or the topcoat, is formed by applying the second low temperature cure coating composition to the first layer. Once the second layer is formed on the first layer, the first catalyst contained in the first layer migrates into the second layer and the second catalyst contained in the second layer migrates into first layer.

Unlike the first catalyst, the second catalyst catalyzes the crosslinking reaction between the first hydroxy-functional resin and the first crosslinking agent contained in the first low temperature cure coating composition. Likewise, and contrary to the second catalyst, the first catalyst catalyzes the crosslinking reaction between the second hydroxy-functional resin and the second crosslinking agent contained in the second low temperature cure coating composition. Consequently, heating the low temperature cure composite coating to a temperature from 80 to 120° C. cures each of the first and second low temperature cure coating compositions to form an at least dual layer composite coating. Advantageously, each of the low temperature cure coating compositions cures in 20 minutes or less.

Each of the low temperature cure coating compositions includes a hydroxy-functional resin, which may be a hydroxy-functional acrylic resin or a hydroxy-functional polyester resin.

Each of the low temperature cure coating compositions includes a crosslinking agent and a catalyst. The crosslinking agents included in adjacent layers of the low temperature cure composite coatings are different, and thus, the catalyst that must be included in directly adjacent layers are different.

The first low temperature crosslinking agent comprises an aminoplast resin comprising alkylol groups, which may be etherified. Melamine formaldehyde resins including methylol groups ($-CH_2OH$) and/or an alkoxymethyl groups are preferred.

The methylol and alkoxymethyl groups of the first low temperature crosslinking agent react with the hydroxyl groups of the first hydroxy-functional resin when catalyzed by a strong acid catalyst, such as an unblocked sulfonic acid. Thus, the strong acid catalyst is included in the second low temperature cure coating composition and excluded from the first low temperature cure coating composition. The strong acid catalyst is only introduced into the first low temperature cure coating composition after the first and second low temperature cure coating compositions are placed in contact with each other to form the low temperature composite coating.

The second low temperature cure coating composition comprises a blocked isocyanate (NCO) resin. Because the NCO functional groups are blocked, the low temperature crosslinking agent of the second low temperature cure coating composition is resistant to the hydroxyl groups of the hydroxy-functional resin at low temperatures, and thus, has a higher onset curing temperature.

Upon heating the second low temperature crosslinking agent in the presence of a metal catalyst, such as an organo tin catalyst, the blocking groups associated with the crosslinker unblock, i.e., remove themselves such that the free NCO groups remain. The free NCO groups are then capable of reacting with the hydroxyl groups of the second hydroxy-functional resin, to form a urethane coating. The metal catalyst necessary to catalyze the reaction between the second hydroxy-functional resin and the second low temperature crosslinking agent is included in the first low temperature cure coating composition and excluded from the second low temperature cure coating composition. The metal catalyst is only introduced into the second low temperature cure coating composition after the first and second low temperature cure coating compositions are placed in contact with each other to form the low temperature composite coating.

The polymeric substrates coated with the first and second low temperature coating compositions include thermoplastic materials, such as thermoplastic polyolefins (e.g., polyethylene, polypropylene), polyamides, polyurethanes, polyesters, polycarbonates, acrylonitrile-butadiene-styrene (ABS) copolymers, EPDM rubber, acrylic polymers, vinyl polymers, copolymers and mixtures thereof. Metallic substrates, fiberglass substrates, glass substrates, and carbon fiber substrates are also suitable.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 shows a substrate with regions containing no coat, single coats (basecoat with DBTDL; clearcoat with DDBSA) and a double coat.

DETAILED DESCRIPTION OF THE INVENTION

Figure 1:
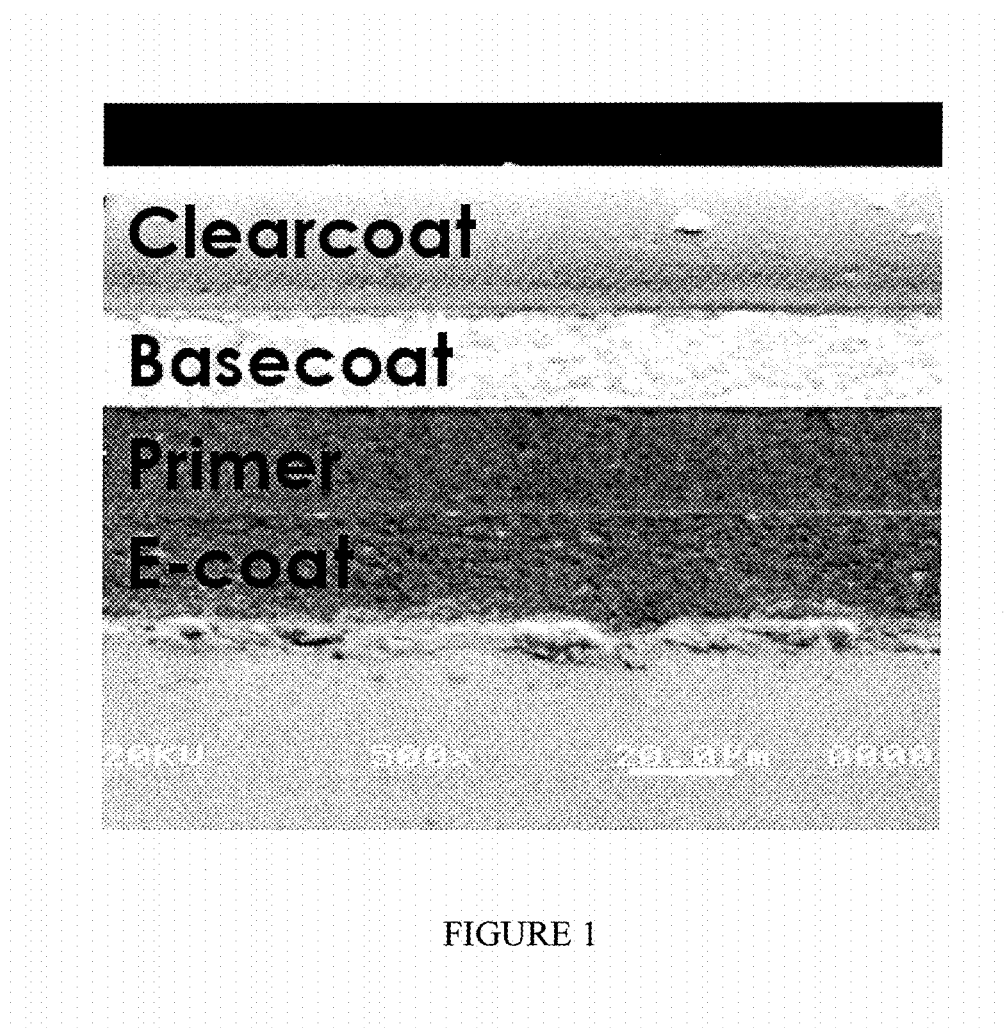
FIG. 1 shows a typical automotive coating containing the following four layers applied to the metal surface vehicle: an e-coat; a primer; a basecoat; and a clearcoat.
Figure 2:
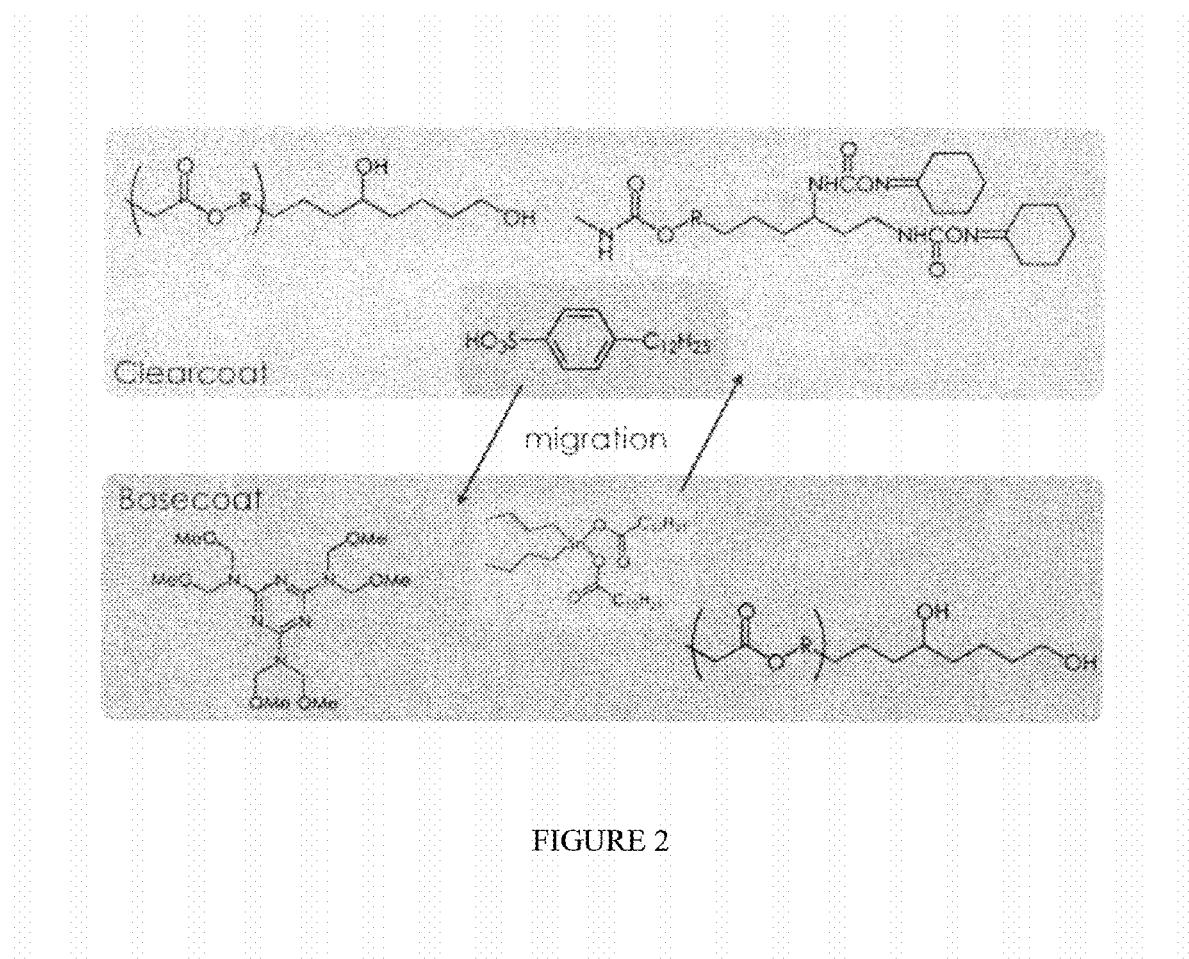
FIG. 2 shows a representation of the dual layer curing mechanism of the low temperature cure composite coating in which the metal catalyst—an organo tin catalyst—contained the basecoat migrates into a clearcoat formed thereon and a strong acid catalyst—an unblocked sulfonic acid catalyst—contained in the clearcoat migrates into the basecoat.

Referring now to the drawings, wherein like reference numerals designate identical or corresponding parts throughout the several views.

The present invention relates to low temperature cure coating compositions, low temperature cure composite coatings that are formed by a double layer curing mechanism, and articles comprising the low temperature cure composite coatings. The low temperature cure coating compositions cure at temperatures from 80 to 120° C., and thus, are suitable for heat sensitive or plastic substrates. The lower temperature coating compositions also cure in 20 minutes or less.

First Low Temperature Cure Coating Composition (Basecoat)

The first low temperature cure coating composition is a solventborne composition that includes at least one hydroxy-functional resin, at least one low temperature crosslinking agent, and at least one metal catalyst. The hydroxy-functional resin of the first low temperature cure coating composition is crosslinkable with the low temperature crosslinking agent contained therein. However, the metal catalyst does not catalyze the crosslinking reaction between the hydroxy-functional resin and the low temperature crosslinking agent contained in the first low temperature cure coating composition; instead, the metal catalyst functions as a catalyst to crosslink a second hydroxy-functional resin and a second low temperature crosslinking agent contained in a second low temperature cure coating composition that is disposed adjacent to and preferably in direct contact with the first low temperature cure coating composition.

The first low temperature coating composition may be a two-component system in which the first component of the system includes the hydroxy-functional resin and the metal catalyst and the second component of the system includes the first low temperature crosslinking agent. Alternatively, the first component of the system may include the first hydroxy-functional resin and the second component of the system may include the first low temperature crosslinking agent and the metal catalyst. Preferably the first low temperature coating composition is a single-component basecoat containing the first hydroxy-functional resin, the first low temperature crosslinking agent, and metal catalyst (i.e., a premixed composition).

The one-component low temperature coating compositions of the basecoat have a pot life, which is defined as the amount of time for the viscosity to double at room temperature (23° C.), of at least 30 days, preferably at least 60 days, and most preferably at least 90 days.

The one-component low temperature cure coating compositions of the basecoat cure within 20 minutes or less when exposed to a strong acid catalyst. Preferably, the one-component low temperature cure coating compositions cure within 10 minutes or less. The curing of the coating composition is assessed by measuring the gel content, which is also commonly referred to as gel fraction, as it directly indicates the extent of cure resulting from the reaction, i.e., cross-linking, of the hydroxy-functional resin and low temperature crosslinking agent. The gel content of the cured basecoat corresponds to the insoluble fraction after storing the basecoat at room temperature under TI-IF for 24 hours. Typically, the gel content is at least 95%, at least 98%, at least 99%, and even 99.9%.

The cured basecoat compositions have a microhardness greater than 90 N/mm$^2$, preferably greater than 100 N/mm$^2$, and more preferably greater than 120 N/mm$^2$, as determined in accordance with DIN EN ISO 14577 using the Fischerscope instrument from Fischer, with a maximum force of 25.6 mN.

First Hydroxy-Functional Resin

The hydroxy-functional resin in the first low temperature coating composition may be any polymer having a hydroxyl functionality that is reactive with the functional groups of the first low temperature crosslinking agent contained in the first low temperature coating composition. Preferably, the hydroxy-functional resin is at least one member selected from the group consisting of an acrylic polymer having a hydroxyl functionality and a polyester polymer having a hydroxyl functionality. Most preferably the hydroxy-functional resin is an acrylic polymer having a hydroxyl functionality. Illustrative commercially available hydroxy-functional resins include those sold under the tradename JONCRYL®.

In addition to the hydroxy functional group, the hydroxy-functional resin may comprise a further reactive functionality so long as it is reactive with the functional groups of the first low temperature crosslinking agent contained in the first low temperature coating composition. In certain embodiments, the hydroxy-functional resin includes at least one further functionality selected from the group consisting of an amine functionality, a carboxylic acid functionality, and an epoxy functionality.

The hydroxy-functional resin present in the first low temperature coating composition may, in general, have any glass transition temperature which, in combination with the glass transition temperature of the first low temperature crosslinking agent and the equivalent weight of the hydroxy-functional resin, results in the production of a cured film having a desired hardness. Preferably the hydroxy-functional resin has a glass transition temperature of from −20° C. to 100° C., more preferably from 0° C. to 75° C., and most preferably from 10° C. to 50° C.

The hydroxy-functional resin present in the first low temperature coating composition may have a number average molecular weight (Mn), as measured by gel permeation chromatography (GPC), from 500 to 30,000, or from 600 to 20,000, or from 750 to 10,000.

The hydroxy-functional resin present in the first low temperature coating composition has a hydroxyl equivalent weight from 100 to 3,000 grams resin/eq hydroxyl, preferably from 200 to 1,500 grams resin/eq hydroxyl, and more preferably from 250 to 800 grams resin/eq hydroxyl, or even 300 to 700 grams resin/eq hydroxyl.

Suitable hydroxy-functional acrylic resins and polyester resins have sufficient hydroxyl contents for reactivity at the desired curing temperatures of 80 to 120° C., preferably 80 to 115° C., and more preferably from 80 to 110° C. or even from 80 to 105° C. The acrylic resins may have a hydroxyl number of from 15 to 565 mg KOH/g, preferably from 35 to 280 mg KOH/g, and more preferably from 70 to 225 mg KOH/g. The hydroxyl number may be less than 200 mg KOH/g, for instance less than 185 mg KOH/g, or less than 175 mg KOH/g. The hydroxy-functional acrylic resins generally have an average of at least two active hydrogen groups per molecule.

Generally, the hydroxy-functional resin is present in the first low temperature cure coating composition in an amount ranging from 10 to 90 percent by weight, preferably from 35 to 65 percent by weight, and more preferably from 45 to 65 percent by weight, based on a total weight of resin solids in the composition.

First Low Temperature Crosslinking Agent

The low temperature crosslinking agent of the first low temperature cure coating composition comprises an aminoplast resin, which is reactive with the hydroxyl functionality of the first hydroxy-functional resin when catalyzed. Aminoplast resins are based on the condensation products of formaldehyde, with an amino- or amido-group carrying substance, such as melamine, urea, or benzoguanamine.

The aminoplast resins preferably contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins are partially alkylated with methanol or butanol or mixtures thereof.

Melamine formaldehyde resins including either a methylol group (—CH$_2$OH), an alkoxymethyl group of general formula —CH$_2$OR$_1$, where R$_1$ is an alkyl chain having from 1 to 20 carbon atoms, preferably from 1 to 6 carbon atoms, more preferably from 1 to 4 carbon atoms, and combinations thereof are preferred.

The crosslinking agent of the first low temperature cure coating composition is preferably selected from hexamethoxymethyl melamine (HMMM), which has the following structure:

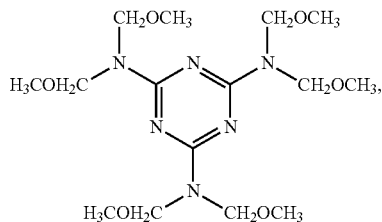

hexa(butoxymethyl) melamine (HBMM), which has the following structure:

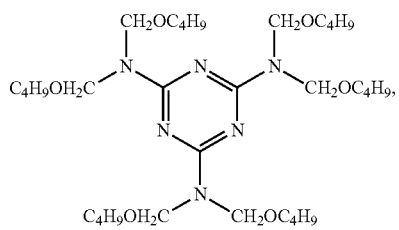

and
a combination of HMMM and HBMM. Melamine substituted with combination of butoxymethyl and methoxymethyl groups is also suitable.

The methylol and alkoxymethyl groups of the low temperature crosslinking agent (e.g., the CH$_2$OCH$_3$ ether groups of HMMM) are particularly reactive with the hydroxyl groups of the hydroxy-functional resin when catalyzed by a strong acid catalyst such as an unblocked sulfonic acid. However, the first low temperature cure coating composition does not comprise a strong acid catalyst, but instead includes a metal catalyst that does not catalyze a crosslinking reaction between hydroxyl groups of the hydroxy-functional resin and the low temperature crosslinking agent of the first low temperature cure coating composition.

The low temperature crosslinking agent is present in the first low temperature cure coating composition in an amount ranging from 10 to 90 percent by weight, preferably from 15 to 65 percent by weight, and more preferably from 20 to 40 percent by weight, based on a total weight of resin solids in the composition.

Metal Catalyst

The metal catalyst included in the first low temperature cure coating composition is an organometallic compound selected from aliphatic bismuth carboxylates such as bismuth ethylhexanoate, bismuth subsalicylate (having an empirical formula C$_7$H$_5$O$_4$Bi), bismuth hexanoate, bismuth ethylhexanoate or dimethylol-propionate, bismuth oxalate, bismuth adipate, bismuth lactate, bismuth tartarate, bismuth salicylate, bismuth glycolate, bismuth succinate, bismuth formate, bismuth acetate, bismuth acrylate, bismuth methacrylate, bismuth propionate, bismuth butyrate, bismuth octanoate, bismuth decanoate, bismuth stearate, bismuth oleate, bismuth eiconsanoate, bismuth benzoate, bismuth malate, bismuth maleate, bismuth phthalate, bismuth citrate, bismuth gluconate; bismuth acetylacetonate; bis-(triorgano tin)oxides such as bis(trimethyl tin) oxide, bis(triethyl tin) oxide, bis(tripropyl tin) oxide, bis(tributyl tin) oxide, bis (triamyl tin) oxide, bis(trihexyl tin) oxide, bis(triheptyl tin) oxide, bis(trioctyl tin) oxide, bis(tri-2-ethylhexyl tin) oxide, bis(triphelihyl tin) oxide, bis(triorgano tin)sulfides, (triorgano tin)(diorgano tin) oxides, sulfoxides, and sulfones, bis(triorgano tin)dicarboxylates such as bis(tributyl tin) adipate and maleate; bis(triorgano tin)dimercaptides, triorgno tin salts such as trioctyl tin octanoate, tributyl tin phosphate; (triorgano tin)(organo tin)oxide; trialkylalkyloxy tin oxides such as trimethylmethoxy tin oxide, dibutyl tin diacetylacetonate, dibutyl tin dilaurate; trioctyl tin oxide, tributyl tin oxide, dialkyl tin compounds such as dibutyl tin oxide, dioctyl tin oxide, dibutyl tin dilaurate, dibutyl tin diacetate, dibutyl tin dimaleate, dibutyl tin distearate, dipropyl tin dioctoate and dioctyl tin oxide; monoalkyl tin compounds such as monobutyltin trioctanoate, monobutyl tin triacetate, monobutyl tin tribenzoate, monobutyl tin trioctylate, monobutyl tin trilaurate, monobutyl tin trimyristate, monomethyl tin triformate, monomethyl tin triacetate, monomethyl tin trioctylate, monooctyl tin triacetate, monooctyl tin trioctylate, monooctyl tin trilaurate; monolauryl tin triacetate, monolauryl tin trioctylate, and monolauryl tin trilaurate; zinc octoate, zinc naphthenate, zinc tallate, zinc carboxylates having from about 8 to 14 carbons in the carboxylate groups, zinc acetate; lithium carboxylates such as lithium acetate, lithium 2-ethylhexanoate, lithium naphthenate, lithium butyrate, lithium isobutyrate, lithium octanoate, lithium neodecanoate, lithium oleate, lithium versatate, lithium tallate, lithium oxalate, lithium adipate, lithium stearate; lithium hydroxide; zirconium alcoholates, such as methanolate, ethanolate, propanolate, isopropanolate, butanolate, tert-butanolate, isobutanolate, pentanolate, neopentanolate, hexanolate and octanolate; zirconium carboxylates such as formate, acetate, propionate, butanoate, isobutanoate, pentanoate, hexanoate, cyclohexanoate, heptanoate, octanoate, 2-ethylhexanoate, nonanoate, decanoate, neodecanoate, undecanoate, dodecanoate, lactate, oleate, citrate, benzoate, salicylate and phenylacetate; zirconium 1,3-diketonates such as acetylacetonate (2,4-pentanedionate), 2,2,6,6-tetramethyl-3,5-heptanedionate, 1,3-diphenyl-1,3-propanedionate (dibenzoylmethanate), 1-phenyl-1,3-butananedionate and 2-acetylcyclohexanonate; zirconium oxinate; zirconium 1,3-ketoesterates, such as methyl acetoacetate, ethyl acetoacetate, ethyl-2-methyl acetoacetate, ethyl-2-ethyl acetoacetate, ethyl-2-hexylacetoacetate, ethyl-2-phenyl-acetoacetate, propyl acetoacetate, isopropyl acetoacetate, butyl acetoacetate, tert-butyl acetoacetate, ethyl-3-oxo-valerate, ethyl-3-oxo-hexanoate, and 2-oxo-cyclohexane carboxylic acid ethyl esterate; zirconium 1,3-ketoamidates, such as N,N-diethyl-3-oxo-butanamidate, N,N-dibutyl-3-oxo-butanamidate, N,N-bis-(2-ethylhexyl)-3-oxo-butanamidate, N,N-bis-(2-methoxyethyl)-3-oxo-butanamidate, N,N-dibutyl-3-oxo-heptanamidate, N,N-bis-(2-methoxyethyl)-3-oxo-heptanamidate, N,N-bis-(2-ethylhexyl)-2-oxo-cyclopentane carboxamidate, N,N-dibutyl-3-oxo-3-phenylpropanamidate, N,N-bis-(2-methoxyethyl)-3-oxo-3-phenylpropanamidate; and combinations of the foregoing metal catalysts.

Advantageously, the metal catalyst is a dialkyl tin compound selected from dibutyltin oxide, dioctyl tin oxide, dibutyl tin dilaurate, dibutyl tin diacetate, dibutyl tin dimaleate, dibutyl tin distearate, dipropyl tin dioctoate, and dioctyl tin oxide. Dibutyl tin dilaurate is preferred.

The amount of the metal catalyst included in the first low temperature cure coating composition is from 0.01 to 10 percent by weight, preferably from 0.05 to 7.5 percent by weight, and more preferably from 1.0 to 5.0 percent by weight, based on the total weight of resin solids in the coating composition. As a portion of the metal catalyst will migrate into a second low temperature cure coating composition, the minimum content of the metal catalyst in the first low temperature cure coating composition may be 1.5 percent by weight, 2.0 percent by weight, or 2.5 percent by weight, based on the total weight of resin solids in the first low temperature cure coating composition.

In terms of a total weight of the composition solids in the first low temperature cure coating composition, the amount of the metal catalyst may also range from 0.05 to 10 percent by weight, preferably from 0.25 to 7.5 percent by weight, and more preferably from 0.5 to 5.0 percent by weight. The minimum amount of the metal catalyst may be increased to at least 0.75 percent by weight, at least 1.0 percent by weight, or 2.0 percent by weight, based on the total weight of resin solids in the first low temperature cure coating composition, to ensure sufficient migration of the metal catalyst into the second low temperature cure coating composition.

Pigments and Colorants

The first low temperature cure coating composition may be colored with at least one pigment or colorant. Examples of suitable pigments or colorants comprise metal oxides, such as zinc oxide, antimony oxide, iron oxides, titanium dioxide, and lead oxides; carbon black; mica, including mica-based effect pigments; metallic pigments, such as aluminum flakes, bronze flakes, nickel flakes, tin flakes, silver flakes, and copper flakes; and organic pigments, such as phthalocyanines, like copper phthalocyanine blue, perylene red and maroon, quinacridone magenta and dioxazine carbazole violet.

The pigments and colorants may range up to 50 percent by weight, up to 40 percent by weight, or up to 30 percent by weight, and may be as low as 10 percent by weight, as low as 5 percent by weight, or as low as 1 percent by weight, based on a total weight of the composition solids in the first low temperature cure coating composition. In terms of the total weight of the first low temperature cure coating composition, the content of the pigment or colorant ranges from 5 to 90 percent by weight, preferably from 10 to 70 percent by weight, and more preferably from 15 to 50 percent by weight.

The first low temperature cure coating composition has a total solids content of 20 percent by weight or more, preferably 25 percent by weight or more, and more preferably 30 percent by weight or more, and up to 80 percent by weight, preferably up to 75 percent by weight, and more preferably up to 60 percent by weight, based on the total weight of the first low temperature cure coating composition. Thus, the total solvent content of the first composition is at least 20 percent by weight, preferably at least 25 percent by weight, and more preferably at least 40 percent by weight and up to 80 percent by weight, preferably up to 75 percent by weight, and more preferably up to 70 percent by weight, based on the total weight of the first composition.

Solvents

Suitable solvents for the first low temperature cure coating composition include aromatic solvents, such as toluene, xylene, naptha, and petroleum distillates; aliphatic solvents, such as heptane, octane, and hexane; ester solvents, such as butyl acetate, isobutyl acetate, butyl propionate, ethyl acetate, isopropyl acetate, butyl acetate, amyl acetate, hexyl acetate, heptyl acetate, ethyl propionate, isobutylene isobutyrate, ethylene glycol diacetate, and 2-ethoxyethyl acetate; ketone solvents, such as acetone, methyl ethyl ketone, methyl amyl ketone, and methyl isobutyl ketone; lower alcohols, such as methanol, ethanol, isopropanol, n-butanol, 2-butanol; glycol ethers such as ethylene glycol monobutyl ether, diethylene glycol butyl ether; glycol ether esters such as propylene glycol monomethyl ether acetate, ethylene glycol butyl ether acetate, 3-methoxy n-butyl acetate;

lactams, such as N-methyl pyrrolidone (NMP); and mixtures thereof. In certain embodiments the solvent is VOC exempt solvent such as chlorobromomethane, 1-bromopropane, $C_{12-18}$ n-alkanes, t-butyl acetate, perchloroethylene, benzotrifluoride, p-chlorobenzotrifluoride, acetone, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane. Preferably, the solvent of the first low temperature cure coating composition is at least one selected from a lower alcohol such as butanol and an ester such as t-butyl acetate. Advantageously, no water is included in the first low temperature coating composition.

Second Low Temperature Cure Coating Composition (Topcoat)

The second low temperature cure coating composition is a solventborne composition that includes at least one hydroxy-functional resin, at least one low temperature crosslinking agent, which is different from the crosslinking agent included in the first low temperature cure coating composition, and at least one strong acid catalyst.

Analogous to the first low temperature coating composition, the second low temperature coating composition may be in the form of a one- or two-component system. Advantageously, the second low temperature coating composition is a single-component composition containing the second hydroxy-functional resin, the second low temperature crosslinking agent, and the strong acid catalyst (i.e., a premixed composition).

The one-component low temperature coating compositions of the topcoat have a pot life of at least 30 days, preferably at least 60 days, and most preferably at least 90 days.

The one-component low temperature cure coating compositions of the topcoat cure within 20 minutes or less when exposed to a metal catalyst. Preferably, the one-component low temperature cure coating compositions cure within 10 minutes or less. The gel content of the cured topcoat corresponds to the insoluble fraction after storing the topcoat at room temperature under THF for 24 hours. Typically, the gel content is at least 95%, at least 98%, at least 99%, and even 99.9%.

The cured topcoat compositions have a microhardness greater than 90 N/mm$^2$, preferably greater than 100 N/mm$^2$, and more preferably greater than 120 N/mm$^2$, as determined in accordance with DIN EN ISO 14577 using the Fischerscope instrument from Fischer, with a maximum force of 25.6 mN.

Second Hydroxy-Functional Resin

The hydroxy-functional resins included in the second low temperature cure coating composition are the same as those described above for the first low temperature cure coating composition. The hydroxy-functional resins in the first and second low temperature cure coating compositions may be same or different.

The hydroxy-functional resin of the second low temperature cure coating composition is crosslinkable with the low temperature crosslinking agent contained therein. However, the strong acid catalyst does not catalyze a crosslinking reaction between the hydroxy-functional resin and the low temperature crosslinking agent contained in the second low temperature cure coating composition; instead, the strong acid catalyst catalyzes the crosslinking of the hydroxy-functional resin and the low temperature crosslinking agent contained in the first low temperature cure coating composition that is disposed adjacent to and preferably in direct contact with the second low temperature cure coating composition.

The hydroxy-functional resin is present in the second low temperature cure coating composition in an amount ranging from 25 to 75 percent by weight, preferably from 35 to 65 percent by weight, and more preferably from 45 to 65 percent by weight, based on a total weight of resin solids in the composition.

Second Low Temperature Crosslinking Agent

The low temperature crosslinking agent of the second low temperature cure coating composition comprises a blocked isocyanate resin, which reacts with the hydroxyl groups of the hydroxy-functional resin when the blocking groups remove themselves (i.e., unblock) from the isocyanate resin such that free isocyanate groups remain. The free NCO functional groups of the isocyanate resin are then capable of reacting with the hydroxyl groups of the hydroxy-functional resin, to form urethane linkages (—NH—CO—O—) and thus a crosslinked urethane. Without a catalyst, the blocked isocyanate crosslinker remains blocked; even elevated temperatures only slowly unblock the isocyanate resin. As such, the blocked isocyanate resin does not readily crosslink, if at all, with the hydroxy-functional resin at temperatures from 80 to 120° C. in the absence of a metal catalyst. Nor does the blocked isocyanate resin self-crosslink at temperatures below 120° C.

The blocked isocyanate resin is substantially blocked, meaning that more than 90% of the NCO groups are blocked, preferably more than 95%, more than 99%, or more than 99.5% of the NCO groups are blocked. The second low temperature crosslinking agent may be completely devoid of free NCO groups. The second hydroxy functional-resin should be devoid of free NCO groups and in certain embodiments the entire second low temperature cure coating composition that forms the topcoat is devoid of free NCO groups.

The blocked isocyanate resin may have a number average molecular weight (Mn), as measured by gel permeation chromatography (GPC), from 150 to 30,000, or from 200 to 20,000, or from 250 to 10,000. The blocked isocyanate may have an NCO equivalent weight (grams of crosslinking agent/equivalent of NCO) from 50 to 1000, preferably from 100 to 500, and more preferably from 150 to 250.

The blocked isocyanate resins are prepared from any desired organic isocyanate, typically polyisocyanate, suitable for the crosslinking. Preference is given to isocyanates containing from 3 to 36, in particular from 8 to about 15 carbon atoms. Examples of suitable diisocyanates include, but are not limited to, trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4-diphenylene diisocyanate (e.g. 4,4'-methylene bisdiphenyldiisocyanate), 1,5-naphthylene diisocyanate, 1,4-naphthylene diisocyanate, 1-isocyanatomethyl-3-isocyanato-3,5,5-trimethylcyclohexane (isophorone diisocyanate or IPDI), 1,3-bis(1-isocyanato-1-methylethyl) benzene (m-tetramethylxylene diisocyanate or TMXDI), bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexane. Of these, hexamethylene diisocyanate, IPDI, and TMXDI are preferred. It is also possible to use polyisocyanates of higher isocyanate functionality. Examples of these include tris(4-isocyanatophenyl)methane, 1,3,5-triisocyanatobenzene, 2,4,6-triisocyanatotoluene, 1,3,5-tris(6-isocyanatohexylbiuret), bis(2,5-diisocyanato-4-methylphenyl)methane, 1,3,5-tris(6-isocyanatohexyl)-1,3,5-triazinane-2,4,6-trione (i.e., hexamethylene diisocyanate cyclic trimer), 1,3,5-tris(6-isocyanatohexyl) and polymeric polyisocyanates, such as dimers and trimers of diisocyanatotoluene. It is further also possible to use mixtures of polyisocyanates. The isocyanates which come into consideration for use as the crosslinker in the invention can also be prepolymers which are derived for example from a polyol, including a polyether polyol or a polyester polyol.

The blocked isocyanate resins are fully blocked, leaving substantially no free isocyanate groups remaining. The blocking agents may be used individually or in combination. Suitable blocking agents include ether alcohols, alkyl alcohols, oximes, amines, amides, hydroxylamines, or any compound with active hydrogen.

Typical alkyl alcohols are aliphatic, cycloaliphatic or aromatic alkyl monoalcohols having 1-20 carbon atoms in the alkyl group, for example, methanol, ethanol, n-propanol, butanol, pentanol, hexanol, heptanol, octanol, nonanol, 2-ethyl hexanol, 3,3,5-trimethylhexan-1-ol, cyclopentanol, cyclohexanol, cyclooctanol, phenol, pyridinol, thiophenol, cresol, phenylcarbinol, and methylphenylcarbinol. Polyfunctional alcohols such as glycerol and trimethylolpropane may also be employed as a blocking agent.

Typical ether alcohols are ethylene glycol mono alkyl ether, diethylene glycol mono alkyl ether, propylene glycol mono alkyl ether or dipropylene glycol mono alkyl ether with alkyl group of 1-10 carbon atoms, for example, diethylene glycol mono butyl ether, ethylene glycol butyl ether, diethylene glycol mono methyl ether, ethylene glycol methyl ether, dipropylene glycol mono methyl ether, dipropylene glycol mono butyl ether, propylene glycol mono butyl ether, propylene glycol mono methyl ether.

Typical oximes are methyl ethyl ketone oxime, methyl isopropyl ketone, methyl isobutyl ketone oxime, methyl isoamyl ketone oxime, methyl n-amyl ketone oxime, methyl 2-ethylhexyl ketone oxime, cyclobutanone oxime, cyclopentanone oxime, cyclohexanone oxime, 3-pentanone oxime, 2,4-dimethyl-3-pentanone oxime (i.e., diisopropyl ketone oxime), diisobutyl ketone oxime, di-2-ethylhexyl ketone oxime, acetone oxime, formaldoxime, acetaldoxime, propionaldehyde oxime, butyraldehyde oxime, glyoxal monoxime, diacetyl monoxime.

A typical hydroxylamine is ethanolamine. Typical amides are caprolactam, methylacetamide, succinimide, and acetanilide. Amines include dibutylamine and diisopropylamine.

A preferred mixture of blocking agents is a polyol, such as glycerol or trimethylolpropane, and an oxime, such as cyclohexanone oxime, diisopropyl ketone oxime, or di-2-ethylhexyl ketone oxime.

The higher the temperature at which the blocking groups dissociate, the less likely that the low temperature crosslinking agent will be able to undergo the necessary crosslinking reaction in the presence of the metal catalyst at 80-120° C.; however, in the absence of a sufficiently stable blocking group, the pot life of the second low temperature cure coating composition is diminished. Accordingly, the blocking groups of the low temperature crosslinking agent of the second low temperature do not unblock, i.e., leave or chemically dissociate, from the isocyanate resin at temperatures less than 50° C., preferably the blocking groups unblock at a temperature from 75 to 120° C., more preferably from 75 to 110° C. and most preferably from 75 to 100° C.

The low temperature crosslinking agent of the second low temperature cure coating composition is preferably represented by the formula (I):

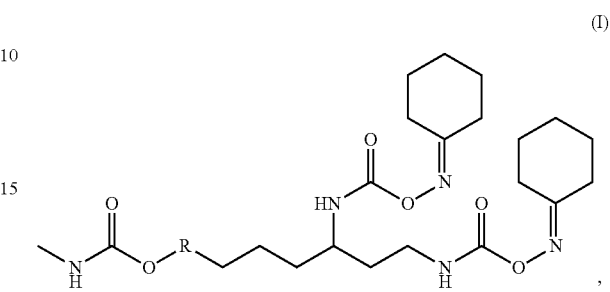

where R represents a $C_{1-20}$ alkyl group.

Another preferred low temperature crosslinking agent of the second low temperature cure coating composition is represented by formula (II):

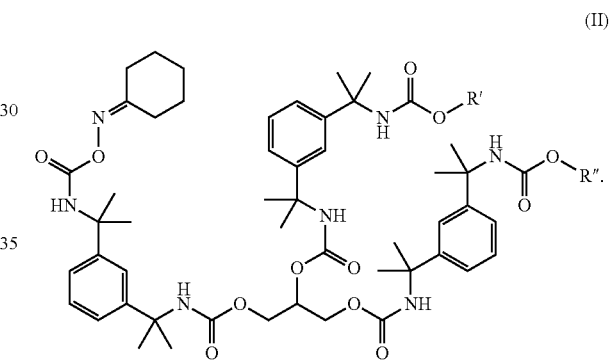

The low temperature crosslinking agent of formula (II) is a combination of glycerol and cyclohexanone oxime blocking agents with 1,3-bis(2-isocyanatopropan-2-yl)benzene, also known as m-tetramethylxylene diisocyanate or TMXDI. In formula (II), R' and R" may represent isocyanates blocked with cyclohexanone oxime, isocyanates blocked with glycerol, or oligomerized combinations of the two blocking reagents.

Additional examples of suitable low temperature crosslinking agents have formulae (III)-(VIII):

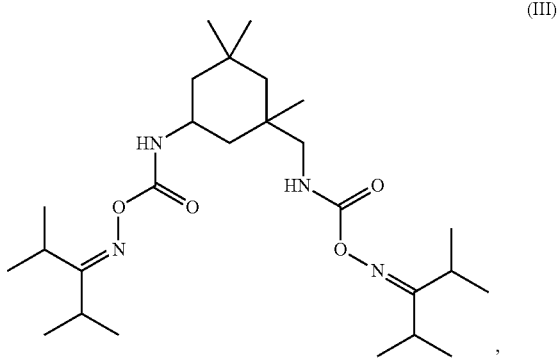

(IV)
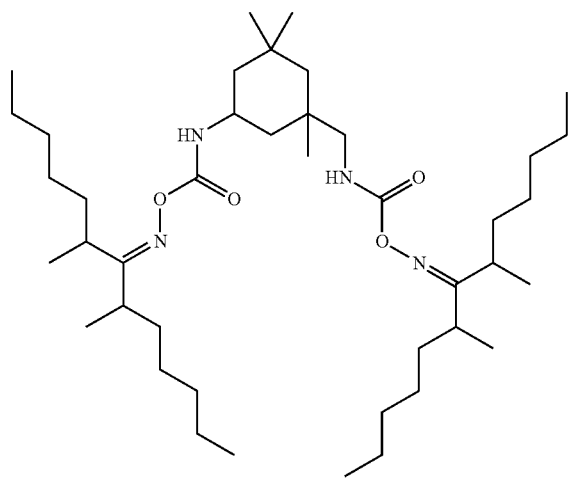

(V)
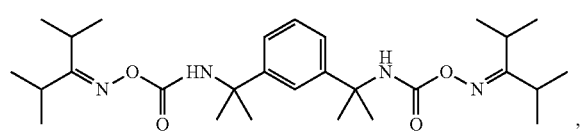

(VI)
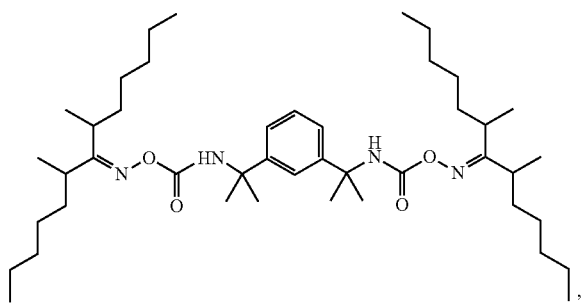

(VII)
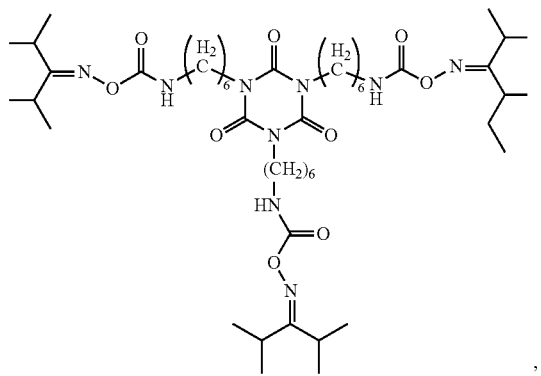
, and (VII)
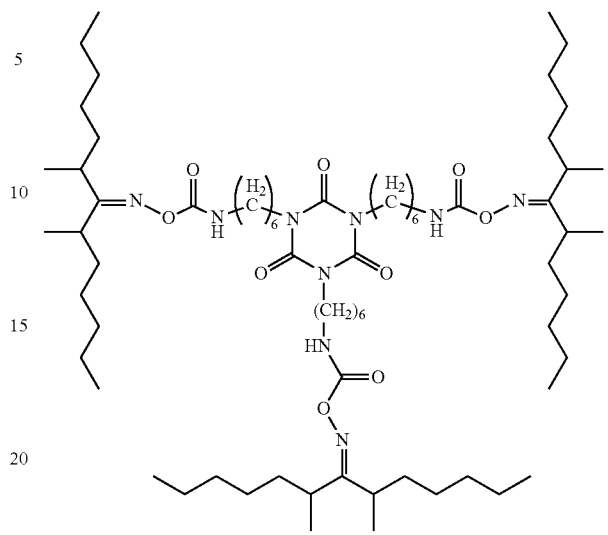

Oxime-blocked isocyanate (without any additional blocking agents) may be highly crystalline and have low solubility in the desired organic solvents, for example, ketone, acetate, and ester solvents. The inclusion of a second blocking agent, such as glycerol, provides the blocked isocyanate with structural irregularity, thereby decreasing the crystallinity and increasing the solubility in the ketone, acetate, and ester solvents. In certain embodiments, from 25% to 45% of the blocked functionality is from a blocking agent such as glycerol and from 55% to 75% is from an oxime blocking agent such as cyclohexanone oxime on a molar basis, preferably from 30% to 40% from the glycerol and from 60% to 70% of the oxime blocking agent.

Although the blocking groups of the blocked isocyanate resin (e.g., cyclohexanone oxime) are not reactive with the hydroxyl groups of the hydroxy-functional resin, free isocyanate groups formed by the removal of the blocking groups are. The free isocyanate groups are provided by combining the blocked isocyanate resin and a metal catalyst at elevated temperatures. Once formed, the free isocyanate groups react with the hydroxyl groups of the hydroxy-functional resin to cure the second coating composition and to provide the urethane coating. As noted above, however, the second low temperature cure coating composition does not comprise a metal catalyst, but instead includes a strong acid catalyst such as an unblocked organic sulfonic acid. The metal catalyst is incorporated into the second low temperature coating composition upon contacting the first and second compositions.

The low temperature crosslinking agent is present in the first low temperature cure coating composition in an amount ranging from 25 to 75 percent by weight, preferably from 35 to 65 percent by weight, and more preferably from 45 to 55 percent by weight, based on a total weight of resin solids in the composition.

Strong Acid Catalyst

The strong acid catalyst included in the first low temperature cure coating composition is an unblocked acid catalyst. Preferably, the unblocked catalyst comprises an organic sulfonic acid, particularly para-toluenesulfonic acid (pTSA), methanesulfonic acid (MSA), dodecylbenzene sulfonic acid (DDBSA), dinonylnaphthalene disulfonic acid (DNNDSA), and mixtures thereof.

The strong acid catalyst functions to catalyze the reaction between the methylol and alkoxymethyl groups of the low temperature crosslinking agent (e.g., the $CH_2OCH_3$ ether groups of HMMM) with the hydroxyl groups of the hydroxy-functional resin contained in the first low temperature cure coating composition discussed above.

The amount of the strong acid catalyst included in the second low temperature cure coating composition is from 0.1 to 10 percent by weight, preferably from 0.05 to 7.5 percent by weight, and more preferably from 1.0 to 5.0 percent by weight, based on the total weight of resin solids in the second low temperature cure coating composition. As a portion of the strong acid catalyst will migrate into the first low temperature cure coating composition, the minimum content of the strong acid catalyst in the second low temperature cure coating composition may be 1.5 percent by weight, 2.0 percent by weight, or 2.5 percent by weight, based on the total weight of resin solids in the composition.

In terms of a total weight of the composition solids in the second low temperature cure coating composition, the amount of the strong acid catalyst may also range from 0.05 to 10 percent by weight, preferably from 0.25 to 7.5 percent by weight, and more preferably from 0.5 to 5.0 percent by weight. The minimum amount of the strong acid catalyst may be increased to at least 0.75 percent by weight, at least 1.0 percent by weight, or 2.0 percent by weight, based on the total weight of resin solids in the composition, to ensure sufficient migration of the strong acid catalyst into the first low temperature cure coating composition.

Pigments and Colorants

The second low temperature cure coating composition may also be colored with at least one pigment or colorant. The pigments and colorants included in the second low temperature cure coating composition are the same as those described above for the first low temperature cure coating composition.

The pigments and colorants may range up to 50 percent by weight, up to 40 percent by weight, or up to 30 percent by weight, and may be as low as 10 percent by weight, as low as 5 percent by weight, or as low as 1 percent by weight, based on a total weight of the composition solids in the second low temperature cure coating composition. In terms of the total weight of the second low temperature cure coating composition, the content of the pigment or colorant ranges from 5 to 90 percent by weight, preferably from 10 to 70 percent by weight, and more preferably from 15 to 50 percent by weight. Advantageously, the second low temperature cure coating is free of pigments and/or colorants.

The second low temperature cure coating composition has a total solids content of 20 percent by weight or more, preferably 25 percent by weight or more, and more preferably 30 percent by weight or more, and up to 80 percent by weight, preferably up to 75 percent by weight, and more preferably up to 60 percent by weight, based on the total weight of the second low temperature cure coating composition. The total solvent content of the second composition ranges from at least 5 percent by weight up to 80 percent by weight, preferably at least 10 percent by weight up to 70 percent by weight, and more preferably at least 15 percent by weight up to 50 percent by weight, based on the total weight of the composition.

Solvent

The solvents included in the second low temperature cure coating composition are the same as those described above for the first low temperature cure coating composition. The solvents in the first and second low temperature cure coating compositions may be same or different.

Preferably, the solvents of the second low temperature coating composition are selected from mixtures of methyl isobutyl ketone, propylene glycol monomethyl ether acetate, and t-butyl acetate, mixtures of methyl isobutyl ketone and toluene, mixtures of methyl isobutyl ketone and methanol, mixtures of methyl isobutyl ketone and heptane, and mixtures of methyl isobutyl ketone and propylene glycol monomethyl ether acetate. Most preferred are mixtures containing from 40 to 60 percent by weight of toluene, from 15 to 35 percent by weight of propylene glycol monomethyl ether acetate, and from 15 to 35 percent by weight of methyl isobutyl ketone. Advantageously, no water is included in the first low temperature coating composition.

Additives

Each of the first and second coating compositions may also contain other additives such as surfactants, stabilizers, wetting agents, rheology control agents, dispersing agents, UV absorbers, hindered amine light stabilizers, adhesion promoters, etc. These additives may account for 0.1 to 5 percent by weight, preferably from 0.5 to 4 percent by weight, and more preferably from 0.5 to 2.5 percent by weight, based on the total weight of resin solids in the respective coating compositions.

The first and second low temperature coating compositions are applied to a substrate to form a low temperature cure composite coating. Suitable substrates include wood, fiberglass, metal, glass, cloth, carbon fiber, and polymeric substrates.

Suitable metal substrates that can be coated include ferrous metals such as iron, steel, and alloys thereof, non-ferrous metals such as aluminum, zinc, magnesium and alloys thereof, and combinations thereof. Useful polymeric substrates include thermoplastic materials, such as thermoplastic polyolefins (e.g., polyethylene, polypropylene), polyamides, polyurethanes, polyesters, polycarbonates, acrylonitrile-butadiene-styrene (ABS) copolymers, EPDM rubber, acrylic polymers, vinyl polymers, copolymers and mixtures thereof. Thermoplastic polyolefins are preferred.

The low temperature cure coating compositions are particularly useful for coating polymeric substrates that are found on motor vehicles such as automobiles, trucks, and tractors. The low temperature cure coating compositions may also be applied to molded articles, toys, sporting goods, and cases or coverings for electronic devices and small appliances. The components can have any shape, but preferably are in the form of automotive body components such as bodies (frames), hoods, doors, fenders, bumpers and/or trim for automotive vehicles.

The low temperature cure composite coatings are formed by successively applying the first and second low temperature cure coating compositions to a substrate. Applying the first low temperature cure coating composition to the substrate provides a basecoat. After applying the basecoat, the solvent may be partially or completely driven from the basecoat by heating or air-drying, for instance a portion of the solvent may be partially removed with an ambient flash that last for 1 to 10 minutes. The ambient flash removes enough solvent to raise the solids content of the basecoat from 60 to 95 percent by weight, from 70 to 90 percent by weight, or from 75 to 85 percent by weight. Alternatively, no solvent may be removed from basecoat disposed on the substrate. Any heating of the basecoat should be conducted without premature crosslinking between the hydroxy-functional resin and the low temperature crosslinking agent or the self-crosslinking of these components since any crosslinking will diminish the ability of the catalysts to migrate in and out of the basecoat.

After applying the basecoat, which may be partially or completely dried, the second low temperature cure coating composition is applied to the basecoat, to obtain a topcoat. Together, the basecoat and the topcoat form a low temperature cure composite coating. The topcoat is advantageously a clearcoat. In this context, topcoat does not necessarily mean it is the outermost coat as other layers may be included on the topcoat. Likewise, the basecoat is not necessarily the first coat in contact with the substrate as additional layers may be provided on the substrate under the basecoat, for example, an e-coat or a primer layer.

The initially deposited basecoat includes a first hydroxy-functional resin, the aminoplast crosslinking agent, and the metal catalyst, while the initially deposited topcoat includes a second hydroxy-functional resin, the blocked isocyanate crosslinking agent, and the strong acid catalyst.

After disposing the topcoat on the substrate provided with the basecoat such that the topcoat and basecoat contact each other, the metal catalyst in the basecoat partially migrates into the topcoat and the strong acid catalyst in the topcoat partially migrates into the basecoat. As a result, the low temperature cure composite coating ultimately comprises a substrate, a final basecoat, and a final topcoat, where the final basecoat comprises the first hydroxy-functional resin, the aminoplast crosslinking agent, the strong acid catalyst, and the metal catalyst, and where the final topcoat comprises the second hydroxy-functional resin, the blocked isocyanate crosslinking agent, the strong acid catalyst, and the metal catalyst.

Notably, while the first hydroxy-functional resin and the aminoplast crosslinking agent are unable to self-crosslink or crosslink with each other in the presence of the metal catalyst, the first hydroxy-functional resin and the aminoplast crosslinking agent are able crosslink with each other in the presence of the strong acid catalyst that migrated into the basecoat from the topcoat. Likewise, although the second hydroxy-functional resin and the blocked isocyanate crosslinking agent are unable to self-crosslink or crosslink with each other in the presence of the strong acid catalyst, the second hydroxy-functional resin and the blocked isocyanate crosslinking agent are able crosslink with each other in the presence of the metal catalyst that migrated into the topcoat from the basecoat. Accordingly, heating the low temperature cure composite coatings to a temperature from 80° C. to 120° C., preferably 80° C. to 115° C., and more preferably from 80° C. to 110° C., simultaneously cures the basecoat and the topcoat to provide a dual layer composite coating. In the curing operation, any remaining solvents are driven off and the film-forming materials of the basecoat and the topcoat are each crosslinked.

The strong acid catalyst and the metal catalyst are each independently included in the basecoat in an amount from 0.01 to 10 percent by weight, preferably from 0.05 to 7.5 percent by weight, and more preferably from 1.0 to 5.0 percent by weight, based on the total weight of resin solids in the basecoat. Since the strong acid catalyst migrated into the basecoat from the topcoat, the content of the strong acid catalyst is generally less than the content of the metal catalyst in the basecoat, for instance, by at least 0.25 percent by weight, at least 0.5 percent by weight, or at least 1 percent by weight. The strong acid catalyst and the metal catalyst are also each independently included in the topcoat in an amount from 0.01 to 10 percent by weight, preferably from 0.05 to 7.5 percent by weight, and more preferably from 1.0 to 5.0 percent by weight, based on the total weight of resin solids in the topcoat. Since the metal catalyst migrated into the topcoat from the basecoat, the content of the metal catalyst in the topcoat is generally less than the content of the strong acid catalyst, for instance, by at least 0.25 percent by weight, at least 0.5 percent by weight, or at least 1 percent by weight.

Each of the first and second low temperature cure coating compositions are applied to the substrate in order to give dry film thicknesses from 5 to 90 µm, preferably from 7.5 to 75 µm, and more preferably from 10 to 50 µm. For instance, the dry film thickness of the basecoat is from 5 to 35 µm, preferably from 10 to 30 µm, and more preferably about 20 µm, and the dry film thickness of the topcoat is from 10 to 70 µm preferably from 25 to 50 µm, and more preferably about 45 µm.

In an alternative embodiment, the basecoat may comprise the blocked isocyanate crosslinking agent and the topcoat may comprise the aminoplast crosslinking agent. In this case, the content of the metal catalyst in the basecoat could be less than the content of the strong acid catalyst, and the content of the strong acid catalyst in the topcoat could be less than the content of the metal catalyst in the resulting low temperature composite coating.

The invention is further described in the following examples, which are merely illustrative and do not limit the scope of the invention as described.

EXAMPLES

Experimental

Reagents

Cyclohexanone oxime (97%, P/N C102202), tetramethylxylylene diisocyanate (TMXDI, 97%, P/N 409502), dibutyltin dilaurate (DBTDL, 95%, P/N 291234), 4-dodecylbenzene sulfonic acid (DDBSA, ≥95%, P/N 44198), propylene glycol monomethylether acetate (PGMEA, ≥99.5%, P/N 484431), and methylisobutyl ketone (MIBK, ≥98.5%, P/N 360511) were obtained from Sigma Aldrich. Toluene (ACS Grade, P/N T324-4) and n-butanol (≥99.4%, P/N A399-4) were obtained from Fischer Scientific. Joncryl hydroxyl resin (BASF Joncryl RPD 980B, P/N 50308048) was obtained from BASF. Melamine resin (Resimene 747, P/N 13096014M) was obtained from Ineos. Glycerol (P/N BDH1172-1LP) and t-butyl acetate (99%, P/N CAAAAL08855-0B) were obtained from VWR. All reagents were used as received.

Synthesis of Cyclohexanone Oxime-Blocked, Sterically Hindered Isocyanate

All glassware was dried in a 120° C. oven, prior to set-up. Cyclohexanone oxime (17.6 g, 155.5 mmol) and methyl isobutylketone (11.2 mL) were added to a 1 L round bottom flask, equipped with a pressure-equalizing addition funnel and condenser, and this mixture was heated to 43° C. Next, a small amount of glycerol (2.4 g, 26.1 mmol) was added to the flask while the mixture was stirred, under nitrogen. Thereafter, 1,3-bis(1-isocyanato-1-methylethyl)benzene (27.1 g, 111.1 mmol) was added to the pressure equalizing addition funnel. The 1,3-bis(1-isocyanato-1-methylethyl)benzene was added dropwise to the mixture in the flask, over 1.5-2 h, such that the reaction temperature was maintained below 50° C. The synthesis of the blocked isocyanate is shown below:

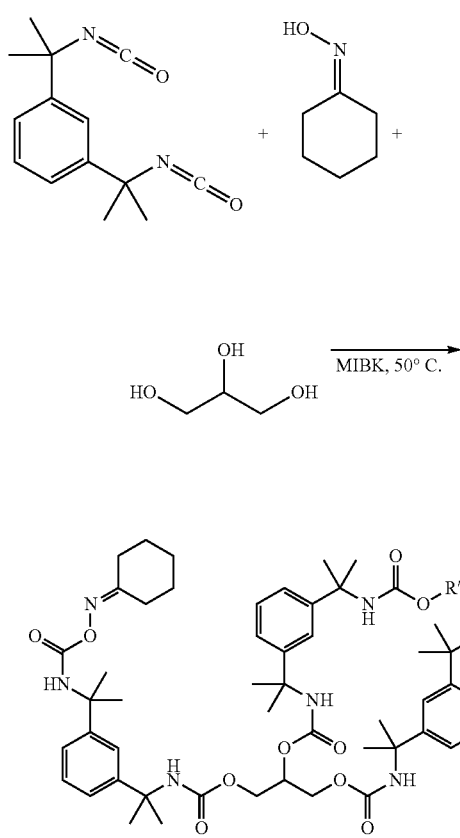

A slurry containing the blocked isocyanate product was obtained after 6 h of reaction and was used for formulation preparation without any further purification. The structure of the final, blocked isocyanate product was confirmed by $^1$H NMR spectroscopy, in particular, an Agilent 400 MHz Nuclear Magnetic Resonance (NMR) spectrometer (MR-400), and the oligomerized product was determined to contain 65% oxime-blocked isocyanate functionality and 35% glycerol-blocked functionality, on a molar basis.

Substrate

Aluminum plates (primed on one side) were supplied by BASF and wiped with acetone prior to use. For all coatings, the untreated side was used due to surface tension/repulsion between the primer and the tested coatings.

Equipment

An Agilent 400 MHz Nuclear Magnetic Resonance (NMR) spectrometer (MR-400) was used for characterization of cyclohexanone oxime-blocked isocyanate.

Coating thicknesses were measured with a non-ferrous Elcometer 456 Coating Thickness Gauge.

DSC measurements were conducted on a Mettler Toledo DSC1, using heating rates of 20° C./min from 50° C. to 200° C.

Isothermal DSC measurements were made at constant temperatures (80° C., 100° C., or 120° C.) for 60 min.

Assessment of Films

Coatings were touched with glove hands to assess if they films were tacky, since tackiness generally indicates the degree of curing.

Each aluminum substrate was bent to assess film brittleness by looking for crack in the film after bending.

Film delamination was tested by cutting an 'x' into a cured film, placing a piece of masking tape over the cuts and pulling the tape off.

MIBK wipe tests were also used to judge cure completion, by placing 1-2 mL of MIBK on a cured film and vigorously wiping with a Kimwipe.

Reference Example 1—Basecoat Cure with Pre-Mixed Active Catalyst

The reference basecoat formulation was prepared by mixing the Joncryl resin (5 g) with hexa(ethoxymethyl) melamine (INEOS, 1 g), n-butanol (61.7 μL, 1 wt % of solids concentration in basecoat), and t-butylacetate (1.2 g, 1.6 mL), at 21° C. for 20 min. Immediately prior to use, 4-dodecylbenzenesulfonic acid (DDBSA, 93.8 μL, 2 wt % of solids in basecoat) was added to the reference basecoat formulation and mixed for 2 min. A 1 mL volume of the reference basecoat formulation was applied to each aluminum plate. The basecoat was pulled down the substrate using a 25 μm (1 mil) drawdown bar, producing a film with a wet thickness of about 25 μm. This film was cured in an oven at the desired temperature (80° C., 100° C., 115° C., or 120° C.), for 20 min, prior to further evaluation.

Reference Example 2—Clearcoat Cure with Pre-Mixed Active Catalyst

The reference clearcoat formulation was prepared by diluting a sample of the blocked isocyanate resin (2.5 g) with 4.3 mL of a solvent mixture of toluene (50 wt %, 1.8 g, 2.1 mL), methyl isobutylketone (25 wt %, 0.9 g, 1.2 mL), and propylene glycol monomethylether acetate (PGMEA, 25 wt %, 0.9 g, 1 mL). The Joncryl resin (3.75 g) was then added to the mixture, which was vigorously stirred at 80° C., for 20 min. Immediately prior to use, dibutyltin dilaurate (DBTDL, 70.1 μL, 2 wt % of solids in clearcoat) was added to the reference clearcoat formulation and mixed for 2 min. This mixture did not fully dissolve the solids, hence the solution was filtered through a 44 μm syringe filter before 1 mL of solution was applied to an aluminum plate. The clearcoat was pulled down the substrate using a 25 μm (1 mil) drawdown bar, producing a film with a wet thickness of about 25 μm. This film was cured in an oven at the desired temperature (80° C., 100° C., 115° C., or 120° C.), for 20 min, prior to further evaluation.

Determination of Coating Curing On-Set Temperature by DSC

Isothermal DSC experiments run for 60 min were used to assess the degree of curing. The reference basecoat (hydroxyl resin, melamine, and DDBSA) fully cures at 80° C., 100° C., or 120° C. When sample pans were opened after an experiment all samples were solid. Additionally, reference basecoat samples containing DDBSA cured at room temperature over a number of hours.

Figure 3:
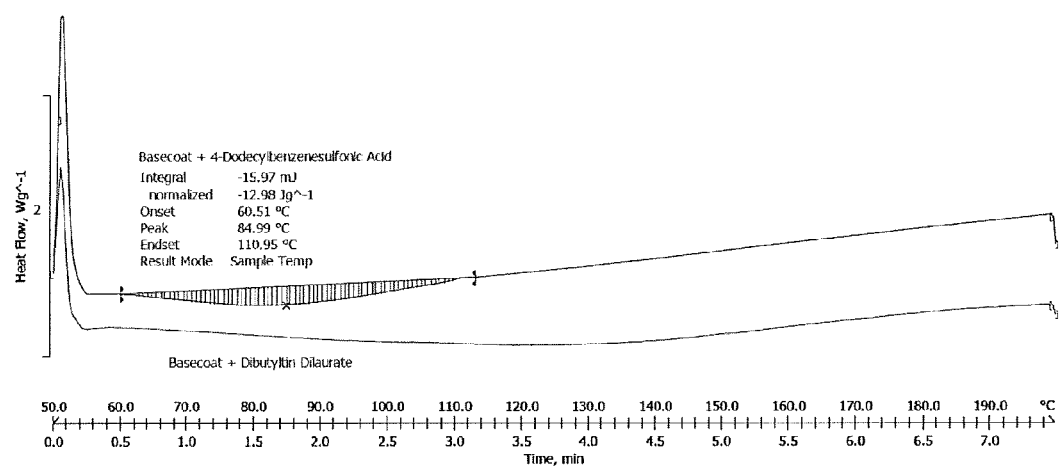
FIG. 3 shows DSC thermograms for basecoat samples containing the basecoat catalyst DDBSA and the clearcoat catalyst DBTDL (heating rate: 20° C./min, exotherms are directed up).

In addition, temperature ramps used to assess the onset temperature of the basecoat cure. FIG. 3 shows the DSC thermograms of the reference basecoat cure with the basecoat catalyst DDBSA (i.e., the active basecoat catalyst), as well as a basecoat sample containing the clearcoat catalyst, DBTDL (i.e., inactive basecoat catalyst). In the reference basecoat sample (hydroxyl resin, melamine, and DDBSA), there is a slight endotherm beginning at 60° C. due to solvent evaporation. Above 100° C., the sample begins to show an exothermic transition with continuously increasing heatflow due to heat released during the curing process or heat capacity changes in the material as it solidifies.

When the basecoat catalyst, DDBSA, is replaced with DBTDL (the clearcoat catalyst), no curing is observed and samples removed from the pan after a DSC experiment are still soft and tacky.

Unlike the basecoat, the clearcoat (blocked isocyanate, hydroxyl resin, DBTDL) cures 100° C. or 120° C. rather than 80° C. This is consistent with room temperature behavior of the clearcoat as it did not cure when left for extended periods of time.

Figure 4:
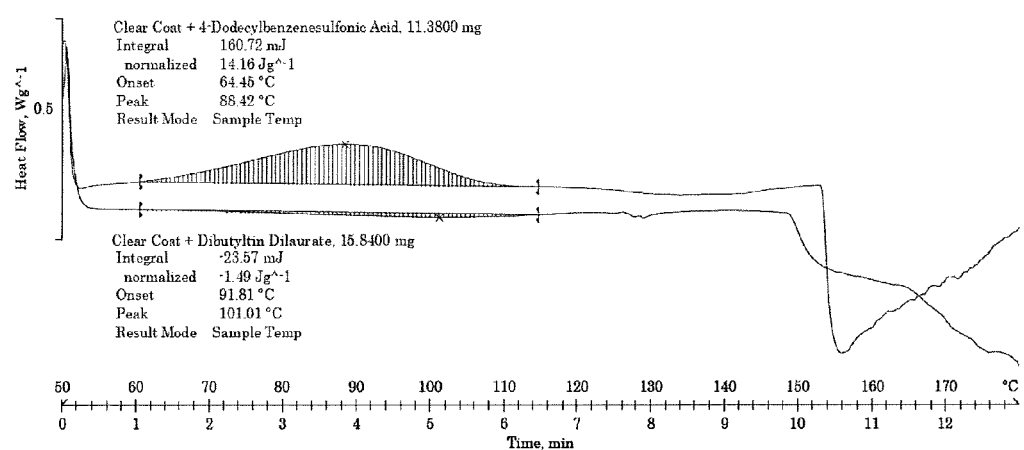
FIG. 4 shows DSC thermograms for clearcoat samples containing the clearcoat catalyst DBTDL and the basecoat catalyst DDBSA (heating rate: 20° C./min, exotherms are directed up).

FIG. 4 shows the DSC thermograms used to assess the onset temperature of the clearcoat cure with the clearcoat catalyst DBTDL (i.e., the active clearcoat catalyst), as well as a clearcoat sample containing the basecoat catalyst, DDBSA (i.e., inactive clearcoat catalyst) during a heat ramp at 20° C./min. In the reference clearcoat sample (blocked isocyanate, hydroxyl resin, DBTDL), no heatflow activity occurs below 90° C. (onset temperature of 91.8° C.), which is consistent with isothermal DSC observations. Above 90° C. there is a very slight endotherm (1.5 J/g) due to a combination of endothermic solvent vaporization and heat being given off from the reaction. Above 150° C. the heatflow becomes unsteady due to loss of a hermetic seal on the aluminum DSC pans and solvent vaporization.

When the clearcoat catalyst (DBTDL) is replaced with DDBSA (basecoat catalyst), there is an exotherm that appears in the DSC thermogram starting at ~65° C., which may occur due to reaction between the oxime and the DDBSA acid catalyst at the elevated temperature.

Overall, the basecoat sample readily cures in the presence of DDBSA at elevated temperature, and even cures slowly at room temperature. Conversely, the clearcoat formulation is only active above 100° C. Upon removal from the DSC pans, both coatings remain tacky if they are not paired with the correct catalyst during curing.

Mixture Stability

The reference basecoat (hydroxyl resin, melamine, and DDBSA) begins to cure at room temperature (approximately 21° C.), and gelling of the mixture is observed within 30 min of mixing the catalyst. After leaving the mixture for 18 h, the mixture solidifies and a soft gel is formed. No reaction is observed when DDBSA is replaced with DBTDL, in the mixture, as the mixture viscosity does not change.

The stability of the reference clearcoat (blocked isocyanate+hydroxyl resin, with either DBTDL or DDBSA) is more difficult to observe since crystals tend to form when the clearcoat is cooled to room temperature (~21° C.). Although the oxime-blocked isocyanate mixture remains soluble at 80° C. in the absence of the catalyst, it begins to crystallize out of the mixture almost immediately when cooled.

Film Assessment

A baseline experiment for the reference clearcoat and the reference basecoat was performed with catalyst loadings of 2 wt %, a bake time of 20 minutes, and curing temperature of 100° C. and 120° C. The reagents and active catalyst were mixed immediately before application. The coatings were assessed for tackiness, film cracking, delamination, and cure completion.

The cured reference basecoat films (cured at any temperature) were not tacky, did not delaminate, and showed no film cracking, as summarized in Table 1. Moreover, the reference basecoats could not be wiped off with an MIBK wipe test.

TABLE 1

|  | Mixture | Temp (° C.) | Tackiness | Delamination | Film Cracking | MIBK Wipe Test |
| --- | --- | --- | --- | --- | --- | --- |
| Reference Ex. 1 | Basecoat + DDBSA | 100 | No tack | No delamination | No cracking | Film intact |
|  | Basecoat + DDBSA | 120 | No tack | No delamination | No cracking | Film intact |
| Reference Ex. 2 | Clearcoat + DBTDL | 100 | No tack | No delamination | No cracking | Film wiped off* |
|  | Clearcoat + DBTDL | 120 | No tack | No delamination | No cracking | Film wiped off* |

*Film wiped off after approximately five wipes.

Reference Example 3—Basecoat Cure with Active Catalyst as a Separate Layer

Reference Example 3 was prepared in the same manner as Reference Example 1 except that the DDBSA was not included in the basecoat formulation. Instead, the basecoat was prepared by applying a basecoat mixture (no catalyst) onto substrate using drawdown method. Then, a second layer containing only DDBSA (2 wt % of solids mass in basecoat) diluted to 10 wt % in MIBK was sprayed on the basecoat mixture and cured at 120° C. for 20 min.

Reference Example 4—Clearcoat Cure with Active Catalyst as a Separate Layer

Reference Example 4 was prepared in the same manner as Reference Example 2 except that the DBTDL was not included in the clearcoat formulation. Instead, the clearcoat was prepared by first applying a solution of DBTDL (2 wt % of solids mass in clearcoat), diluted to 10 wt % in MIBK, by airbrush. Then, a second layer containing only a clearcoat mixture (no catalyst) was sprayed onto the DBTDL and cured at 120° C. for 20 min.

Film Assessment

The coatings of Reference Examples 3 and 4 were assessed for tackiness, film cracking, delamination, and cure completion in the same manner as Reference Examples 1 and 2. The results are shown in Table 2.

TABLE 2

| | Mixture | Temp (° C.) | Tackiness | Delamination | Film Cracking | MIBK Wipe Test |
|---|---|---|---|---|---|---|
| Reference Ex. 3 | Basecoat + DDBSA | 120 | No tack | No delamination | Cracking | Film intact |
| Reference Ex. 4 | Clearcoat + DBTDL | 120 | No tack | No delamination | No cracking | Film wiped off* |

*Film wiped off after approximately five wipes.

As shown in Table 2, neither the basecoat nor the clearcoat films were tacky nor did they delaminate. Some cracking, however, was observed with the basecoat due to excessive catalyst concentration, which caused the top of the basecoat to cure too quickly such that complete diffusion of the catalyst through the entire basecoat was impaired. Accordingly, Example 1 below employed a catalyst loading in the clearcoat of 1.5 wt % DDBSA.

The clearcoat did not crack, and did not delaminate, but was wiped off with the MIBK wipe test, which suggests that the catalyst is migrating but that the concentration may be insufficient. Therefore, and in order to promote a greater degree of clearcoat curing, Example 1 employed a catalyst loading in the basecoat of 5 wt % of DBTDL.

Example 1—Dual Layer (Basecoat and Clearcoat) Cure Having Active Catalyst in the Opposing Layer The basecoat formulation was prepared by mixing the Joncryl resin (5 g) with hexa(ethoxymethyl)melamine (INEOS, 1 g), n-butanol (61.7 µL, 1 wt % of solids in basecoat), and t-butylacetate (1.2 g, 1.6 mL), at 21° C. for 20 min. Immediately prior to use, dibutyltin dilaurate (DBTDL, 233.6 µL, 5 wt % of solids in clearcoat) was added to the basecoat formulation and mixed for 2 min. The DBTDL loading was increased from levels listed in previous cures to promote the clearcoat reaction.

Concurrently, the clearcoat formulation was prepared by diluting a sample of the blocked isocyanate resin (2.5 g) with 4.3 mL of a solvent mixture of toluene (50 wt %, 1.8 g, 2.1 mL), methyl isobutylketone (25 wt %, 0.9 g, 1.2 mL), and propylene glycol monomethylether acetate (25 wt %, 0.9 g, 1 mL). The Joncryl resin (3.75 g) was then added to the mixture, which was vigorously stirred at 80° C., for 20 min. Immediately before use, 4-dodecylbenzenesulfonic acid (DDBSA, 70.1 µL, 1.5 wt % of solids in basecoat) was added to the clearcoat formulation and mixed for 2 min. The DDBSA loading was reduced from levels listed in previous cures to slow down the basecoat reactions. Solids did not fully dissolve in this mixture and the solution was filtered through a 0.45 µm syringe filter.

To confirm that the two catalyst were able to migrate past each other and initiate curing of the opposing layer, the basecoat reagent mixture (containing 5 wt % DBTDL) was applied to a substrate using the drawdown method and then a second layer containing the clearcoat reagent mixture (containing 1.5 wt % DDBSA) was sprayed by airbrush onto the substrate provided with the basecoat. The resulting double layer was cured at 115° C. and 120° C. for 20 min.

For comparison, the basecoat and clearcoat compositions were mixed together into a single mixture, applied to the substrate and cured at 115° C., for 20 min.

The coatings were assessed for tackiness, film cracking and delamination in the same manner as in the reference examples. The results are shown in Table 3.

TABLE 3

| Example | Arrangement | Temp (° C.) | Tackiness | Delamination | Film Cracking | MIBK Wipe Test |
|---|---|---|---|---|---|---|
| Ex. 1 | Clearcoat Basecoat | 120 | No tack | No delamination | No cracking | Film intact |
| Comp. 1 | Mixed Basecoat + Clearcoat | 120 | No tack | No delamination | No cracking | Film intact |

As shown in Table 3, the unmixed and mixed films were not tacky, did not delaminate, and showed no film cracking. MIBK wipe tests showed that the coatings were intact; however, as the clearcoat thickness increased, there was an increased incidence of the films being partially wiped off with vigorous wiping.

Overall, the double-coated films show significant curing when the catalysts are placed in the opposite coatings.

Example 2—Dual Layer (Basecoat and Clearcoat) Cure

The procedure was the same as Example 1, except that the clearcoat crosslinking agent comprised a 1:1: mixture of TMXDI/HDI trimer blocked with a 2:1 mixture of cyclohexanone oxime and glycerol. The films were cured at 120° C. for 30 min, to provide a cured double layer having a thickness of 35-45 µm (25-30 µM basecoat; 10-15 µm clearcoat). MIBK wipe tests showed that the coatings were solvent resistant; and thus, fully cured.

Example 3—Combined Single Layer and Dual Layer Coatings

A combined coating was prepared in which the clearcoat (containing DDBSA, the inactive clearcoat catalyst) and the basecoat (containing DBTDL, the inactive basecoat catalyst) were applied to select regions of the aluminum substrate, as shown in FIG. 5. When the clearcoat and basecoat mixtures containing the inactive catalyst were heated to 120° C., the films came out of the oven tacky, yet when the films are applied on top of each other (with active catalysts being included in the opposite layer) as in Examples 1 and 2, curing occurred and the films were no longer tacky.

Example 4

Figure 6:
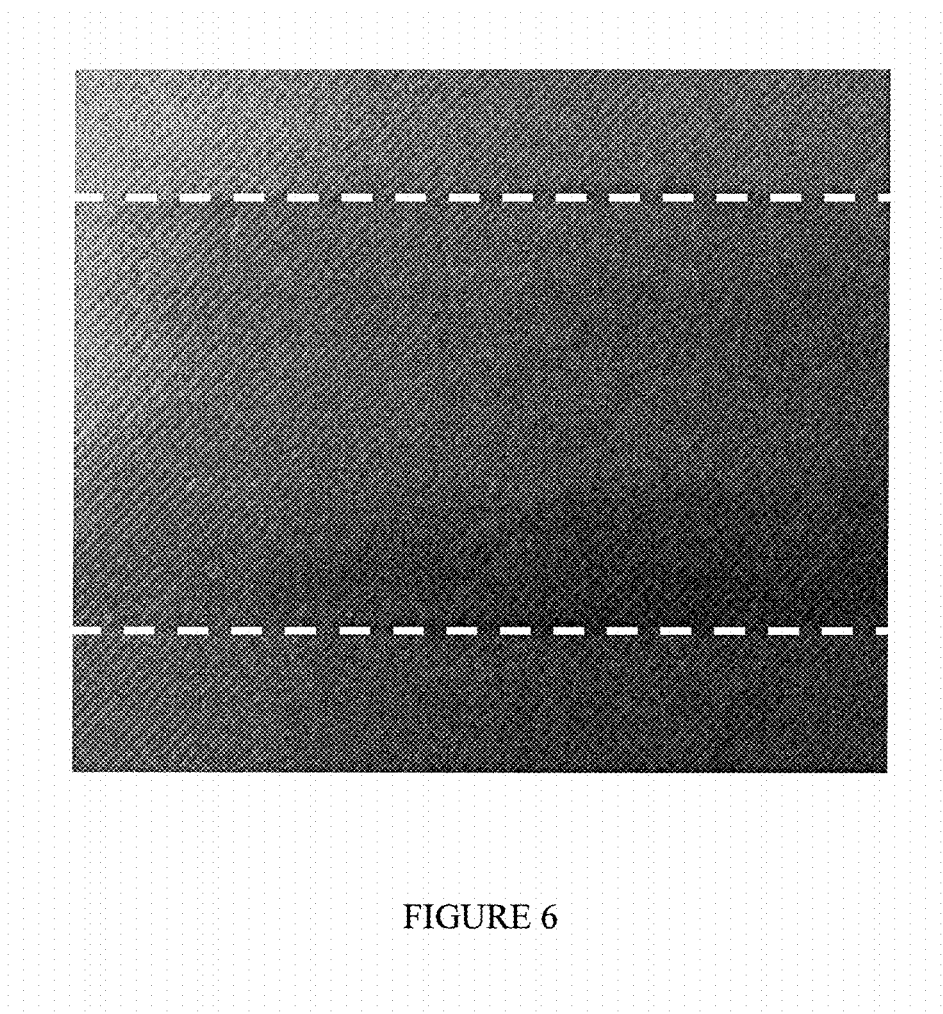
FIG. 6 shows a photograph of a low temperature composite coating cured at 115° C. according to the invention.

In order to further reduce the cure temperature, double layer cures were conducted at 115° C., for comparison with samples cured at 120° C. These samples, cured at 115° C., were prepared with a drawdown bar (obtained from BASF) to achieve greater consistency in the coating thickness. An example photograph of this film is shown in FIG. 6.

a thickness of approximately 100 μm. The presence of two separate coatings affirms the mutual catalyst migration between the basecoat and the clearcoat.

Example 6

An array of blocked isocyanates were prepared in order to assess the effectiveness different blocking agents with isophorone diisocyanate (IPDI) and m-tetramethylxylene diisocyanate (TMXDI). The unblocking temperatures, which were determined by DSC, are summarized below in Table 4:

TABLE 4

| Isocyanate | Property | Blocking Group (cyclohexanone oxime) | (acetophenone oxime) | (diisopropyl ketone oxime) | (3,5-dimethylpyrazole) |
|---|---|---|---|---|---|
| TMXDI | Physical State | Dense Solid | Sticky Solid | Liquid | Liquid |
|  | Unblocking Temperature (° C. by DSC) | 74 | 132 | 107 | No Peak Observed |
| IPDI | Physical State | Dense Solid | Sticky Solid | Liquid | Liquid |
|  | Unblocking Temperature (° C. by DSC) | 118 | 123 | 110 | 136 |
| 50/50 Mixture of TMXDI and IPDI | Physical State | Dense Solid | Sticky Solid | Liquid | Liquid |
|  | Unblocking Temperature (° C. by DSC) | 94/122 | 118 | 100 (broad peak from 90-110) | 128 |

The coating shown in FIG. 6 did not crack, delaminate from the substrate, and was not tacky, although it could be wiped off with MIBK due to the thickness of the clearcoat. Thus, the films produced at 115° C. are qualitatively the same as the double layer coatings cured at 120° C.

Example 5

Figure 7:
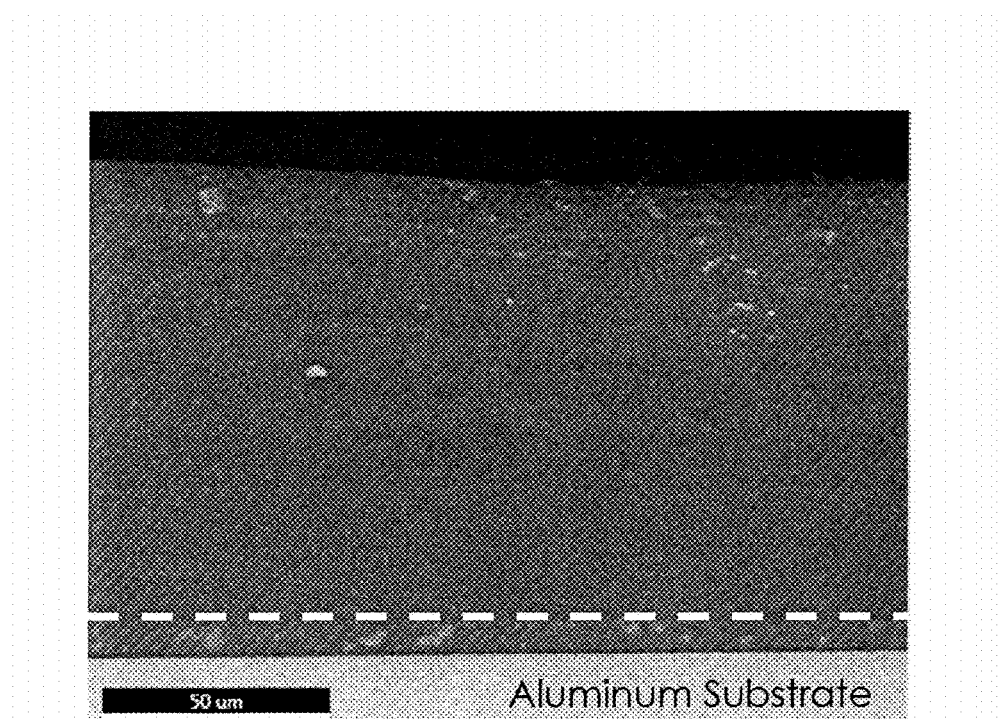
FIG. 7 shows a backscattered electron SEM image of a low temperature composite coating according to the invention.

A dual layer cure was performed at 110° C. for 20 minutes. A backscattered electron SEM (scanning electron microscopy) image of a double layer coating according to the present invention is shown in FIG. 7, where the aluminum substrate is labeled. Two separate layers are present in the double layer cure, where the basecoat is adjacent to the aluminum substrate and has a thickness of approximately 10 μM. The clearcoat is apparent on top of the basecoat and has As shown above, acetophenone oxime and 3,5-dimethyl-1-pyrazole had blocking temperatures that rendered them unsuitable for curing temperatures from 80-120° C.

Double layer cures prepared in the same manner as Example 1 except for having a clearcoat crosslinking agent comprised of TMXDI or IPDI blocked with diisopropyl ketone oxime provided solvent resistant double layer coatings when cured at temperatures from 115-120° C. Double layer cures having a cure temperature of 110° C. provided a clearcoat that could be partially wiped off, indicating a lack of solvent resistance for the particular combination of diisocyanate and blocking agent at that curing temperature.

Obviously, numerous modifications and variations of the present invention are possible in light of the above teachings. It is therefore to be understood that within the scope of the appended claims, the invention may be practiced otherwise than as specifically described herein.

The invention claimed is:

1. A low temperature cure composite coating, comprising:
a substrate;
a first layer comprising a first solventborne low temperature cure coating composition comprising
a first hydroxy-functional resin,
a first low temperature crosslinking agent, which is an aminoplast resin, and
a first catalyst, which is a metal catalyst, and
a first organic solvent; and
a second layer comprising a solventborne low temperature cure coating composition comprising
a second hydroxy-functional resin,
a second low temperature crosslinking agent, which is blocked isocyanate resin,
a second catalyst, which is an unblocked acid catalyst having a pKa from 0.25 to 1.0, and
a second organic solvent,
wherein the first and second layer are adjacent to each other,
wherein the first catalyst catalyzes a crosslinking reaction between the second hydroxy-functional resin and the second low temperature crosslinking agent, and does not catalyze a crosslinking reaction between the first hydroxy-functional resin and the first low temperature crosslinking agent,
wherein the second catalyst catalyzes a crosslinking reaction between the first hydroxy-functional resin and the first low temperature crosslinking agent, and does not catalyze a crosslinking reaction between the second hydroxy-functional resin and the second low temperature crosslinking agent, and
wherein the first and second low temperature cure coating compositions cure within 20 minutes at a temperature from 100-120° C.

2. The coating of claim 1, wherein the aminoplast resin is a condensation product of formaldehyde and melamine.

3. The coating of claim 1, wherein the aminoplast resin is a melamine formaldehyde resin comprising methylol and/or alkoxymethyl groups of formula —$CH_2OR_1$, where $R_1$ is an alkyl chain having from 1 to 6 carbon atoms.

4. The coating of claim 1, wherein the metal catalyst is an organimetallic bismuth, tin, lithium, or zirconium catalyst.

5. The coating of claim 1, wherein the metal catalyst is a dialkyl tin compound selected from the group consisting of dibutyltin oxide, dioctyl tin oxide, dibutyl tin dilaurate, dibutyl tin diacetate, dibutyl tin dimaleate, dibutyl tin distearate, dipropyl tin dioctoate, and dioctyl tin oxide.

6. The coating of claim 1, wherein the blocked isocyanate resin is a polyisocyanate blocked with at least one selected from the group consisting of an ether alcohol, an alkyl alcohol, an oxime, an amine, an amide, and a hydroxylamine.

7. The coating of claim 6, wherein the blocked isocyanate resin is a diisocyanate or triisocyanate blocked with an oxime.

8. The coating of claim 1, wherein the unblocked acid catalyst is an organic sulfonic acid.

9. The coating of claim 8, wherein the organic sulfonic acid is at least one selected from the group consisting of para-toluenesulfonic acid, methanesulfonic acid, dodecylbenzene sulfonic acid, dinonylnaphthalene disulfonic acid, and mixtures thereof.

10. The coating of claim 1, wherein each of the first and second low temperature cure coating compositions has a pot life of at least 30 days.

11. The coating of claim 1, wherein the first and second low temperature cure coating compositions do not comprise water.

12. The coating of claim 1, wherein the first low temperature cure coating composition further comprises a pigment or colorant.

13. The coating of claim 1, wherein the substrate comprises at least one thermoplastic material selected from the group consisting of a polyolefin, a polyamide, a polyurethane, a polyester, a polycarbonate, an acrylonitrile-butadiene-styrene (ABS) copolymer, an EPDM rubber, an acrylic polymer, and a vinyl polymer.

14. The coating of claim 1, wherein the first low temperature cure coating composition comprises, based on a total weight of resin solids in the composition:
from 35 to 65 percent by weight of the first hydroxy-functional resin;
from 15 to 65 percent by weight of the first low temperature crosslinking agent; and
from 0.05 to 7.5 percent by weight of the first catalyst.

15. The coating of claim 14, wherein the first low temperature cure coating composition further comprises the second catalyst, wherein the content of the second catalyst in the first low temperature cure coating composition is less than the content of the first catalyst.

16. The coating of claim 1, wherein the first low temperature cure coating composition comprises, based on a total weight of resin solids in the composition:
from 35 to 65 percent by weight of the second hydroxy-functional resin;
from 35 to 65 percent by weight of the second low temperature crosslinking agent; and
from 0.25 to 7.5 percent by weight of the second catalyst.

17. The coating of claim 16, wherein the second low temperature cure coating composition further comprises the first catalyst, wherein the content of the first catalyst in the second low temperature cure coating composition is less than the content of the second catalyst.

18. A low temperature composite coating, obtained by curing the coating of claim 1 for 20 minutes or less at a temperature from 100 to 120° C.

19. A kit, comprising:
a first one component, solventborne low temperature cure coating composition comprising
a first hydroxy-functional resin,
a first low temperature crosslinking agent, which is an aminoplast resin, and
a first catalyst, which is a metal catalyst, and
an organic solvent; and
a second one component, solventborne low temperature cure coating composition comprising
a second hydroxy-functional resin,
a second low temperature crosslinking agent, which is blocked isocyanate resin,
a second catalyst, which is an unblocked acid catalyst having a pKa from 0.25 to 1.0, and
an organic solvent, wherein the first low temperature cure coating composition does not comprise a catalyst that catalyzes a reaction between the first hydroxy-functional resin and the first low temperature crosslinking agent, and the second low temperature cure coating composition does not comprise a catalyst that catalyzes a reaction between the second hydroxy-functional resin and the second low temperature crosslinking agent.

* * * * *

UNITED STATES PATENT AND TRADEMARK OFFICE
CERTIFICATE OF CORRECTION

PATENT NO. : 10,208,230 B2
APPLICATION NO. : 15/220062
DATED : February 19, 2019
INVENTOR(S) : Timothy December et al.

It is certified that error appears in the above-identified patent and that said Letters Patent is hereby corrected as shown below:

In the Specification

Column 8, Line 54, "tartarate," should read --tartrate,--.

Column 10, Line 55, "naptha," should read --naphtha,--.

In the Claims

Column 29, Line 47, Claim 4, "organimetallic" should read --organometallic--.

Signed and Sealed this
Twenty-first Day of April, 2020

Andrei Iancu
*Director of the United States Patent and Trademark Office*